United States Patent
Kuno

(10) Patent No.: US 7,912,308 B2
(45) Date of Patent: Mar. 22, 2011

(54) IMAGE PROCESSING DEVICE THAT QUICKLY PERFORMS RETINEX PROCESS

(75) Inventor: Masashi Kuno, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 890 days.

(21) Appl. No.: 11/837,877

(22) Filed: Aug. 13, 2007

(65) Prior Publication Data

US 2008/0044100 A1  Feb. 21, 2008

(30) Foreign Application Priority Data

Aug. 18, 2006  (JP) .................................. 2006-223249

(51) Int. Cl.
  *G06K 9/40* (2006.01)
(52) U.S. Cl. ......................................... 382/254; 382/274
(58) Field of Classification Search .................. 382/254,
  382/260, 264, 275, 298, 300, 312, 318, 324,
  382/162, 167, 168, 271, 272, 274; 348/254,
  348/223.1, 231.6; 358/518, 519, 525
  See application file for complete search history.

(56) References Cited

U.S. PATENT DOCUMENTS

| 6,885,482 B1 | 4/2005 | Kubo et al. | |
| 6,947,176 B1 | 9/2005 | Kubo et al. | |
| 7,298,917 B2 * | 11/2007 | Sakatani et al. | ............. 382/254 |
| 7,760,943 B2 * | 7/2010 | Shaked | .......................... 382/174 |
| 2003/0012448 A1 | 1/2003 | Kimmel et al. | |
| 2004/0091164 A1 | 5/2004 | Sakatani et al. | |

FOREIGN PATENT DOCUMENTS

| JP | 2001-69525 | 3/2001 |
| JP | 2001-78025 | 3/2001 |
| JP | 2003-333331 | 11/2003 |
| JP | 2005-004510 | 1/2005 |
| JP | 2005-515515 | 5/2005 |
| JP | 2005-176171 | 6/2005 |
| JP | 3731577 | 10/2005 |
| WO | WO 2005/036870 A1 | 4/2005 |

OTHER PUBLICATIONS

Japanese Official Action dated Sep. 14, 2010 with English language translation.

* cited by examiner

*Primary Examiner* — Yon Couso
(74) *Attorney, Agent, or Firm* — Scully, Scott, Murphy & Presser, PC

(57) ABSTRACT

An image processing device includes a retinex-value calculating portion, a normalizing-parameter reading portion, a normalizing portion, and a correcting portion. The retinex-value calculating portion calculates a retinex value of each pixel in an original image based both on a pixel value of a subject pixel and on a peripheral average luminance of the subject pixel. The normalizing-parameter reading portion reads an upper limit and a lower limit for performing normalization. The normalizing portion normalizes the retinex value based on the upper limit and the lower limit, thereby obtaining a normalized retinex value for each pixel in the original image. The correcting portion corrects the original image based both on the normalized retinex value and on the pixel value for each pixel in the original image, thereby obtaining a corrected image.

23 Claims, 7 Drawing Sheets ial Patent
IMAGE PROCESSING DEVICE THAT QUICKLY PERFORMS RETINEX PROCESS

CROSS REFERENCE TO RELATED APPLICATIONS

This application claims priority from Japanese Patent Application No. 2006-223249 filed Aug. 18, 2006. The entire contents of the priority application is incorporated herein by references.

BACKGROUND OF THE INVENTION

1. Field of the Invention

The invention relates to an image processing device and a storage medium storing an image processing program, and more specifically to an image processing device and a storage medium storing an image processing program that performs a Retinex process on an image.

2. Description of the Related Art

When taking a photograph of a subject under backlit conditions, e.g. against the sun, the image of the subject portion is an indistinct backlit image with low lightness and contrast, making it difficult to make out details of the subject. Image processing is performed to improve the quality of these backlit images, as well as images suffering in quality due to overexposure, underexposure, blurring due to jiggling when capturing the image, noise, insufficient light, and the like, in order to improve lightness and contrast in the image. One method used in conventional image processing is a Retinex process.

The Retinex process preserves the input image data for high-quality regions and improves the image quality primarily in low-quality regions. The Retinex process uses Gaussian filters for calibrating pixel data in the original image to values reflecting data of surrounding pixels, calculates reference component data for the original image from the natural logarithm of the calibrated pixel data, and calculates luminance component data by dividing pixel data of the original image by pixel components of the original image. Specifically, this process divides the original image into reference components and luminance components. Next, a process is performed to calibrate the brightness and level (contrast) of the luminance component through gamma correction or the like and subsequently generates improved image data for the original image in backlit portions and the like by combining the calibrated luminance components with the reference components. The reference component is found by normalizing a reflectance $R(x, y)$)

Next, normalization of the reflectance $R(x, y)$ will be described with reference to FIG. 1. The reflectance $R(x, y)$ is calculated according to equation 1 shown below.

$$R(x, y) = \log \frac{Y(x, y)}{F(x, y) * Y(x, y)} \qquad \text{[Equation 1]}$$

In equation 1, x is the horizontal coordinate, y is the vertical coordinate, $Y(x, y)$ is the luminance value of the pixel at the coordinate (x, y), and "*" is the convolution operator. Further, log is the natural logarithm to the base e. $F(x, y)$ represents a Gaussian filter factor at the subject pixel (x, y) as shown in the following equation:

$$F(x, y) = \exp(-(x^2+y^2)/(c/75)^2) \qquad \text{[Equation 2]}$$

where c is a coefficient determined dependently on the number of the peripheral pixels. So, the value $F(x, y) * Y(x, y)$ indicates the average value of the luminance values of the peripheral pixels.

The reflectance $R(x, y)$ found in the equation 1 for all coordinates are normalized to form a histogram. Normalization is achieved by setting the minimum reflectance $R(x, y)$ among all coordinates to 0 and the maximum value to 255 and linearly setting all reflectance $R(x, y)$ values for other coordinates to integers between 0 and 255. The histogram is formed by tabulating the frequency of pixels indicating each computed value between the maximum and minimum values, An example of the histogram is shown in FIG. 1.

From this histogram, a median value M is found. A clipped range of reflectance $R(x, y)$ values (normalizing parameters) is set based on the median value M and the histogram. As an example, the clipped range has an upper limit U including 45% of all samplincgs greater than the median value M, and a lower limit D including 45% of all samplings smaller than the median value M. The reflectance $R(x, y)$ values corresponding to the upper limit U and lower limit D are called the UpR and DownR values, respectively. In this way, the clipped range (UpR, DownR) is obtained.

A normalized reflectance (normalized Retinex value) refle $(x, y)$ is set to 0.0 when the value of reflectance $R(x, y)$ is less than or equal to the DownR, is set to 1.0 when the value of reflectance $R(x, y)$ is greater than or equal to UpR, and is calculated based on the following equation 3 when the value of reflectance $R(x, y)$ is greater than DownR and less than UpR.

$$refle(x, y) = \frac{R(x, y) - DownR}{UpR - DownR} \qquad \text{[Equation 3]}$$

Through this process, refle(x, y) is normalized to a value between 0.0 and 1.0. Through experimentation, it has been found preferable to add 0.3 to this value to obtain a value between 0.3 and 1.3 for refle (x, y).

U S. Pat. No. 6,885,482 (corresponding to Japanese Patent Application Publication No. 2001-69525) discloses a method of converting RGB values to a color space configured of a luminance component and chromatic components, such as YCbCr or YIQ, performing the Retinex process only on the luminance component Y, while maintaining the chromatic components, and converting the values back to RGB. Calibrating only the luminance component (i.e. not calibrating the chromatic components) prevents an upset in the color balance and a shift in color. Further, since the Retinex process is performed only on the luminance component, this method requires fewer calculations than a method for performing the Retinex process on each RGB plane and, hence, can complete the process quicker, Further, less storage space is required for normalizing reflectance $R(x, y)$ values since only the luminance value is stored, rather than each RGB value.

U.S. Patent Application Publication No. 2004/0091164 (corresponding to Japanese Patent No. 3,731,577) discloses a method for improving the processing speed in the Retinex process. This method forms a reduced image (low-resolution image) from the original image using the average pixel method or the like, forms a peripheral average luminance image (blurred image) by finding the surrounding average luminance for each pixel in the reduced image, forms a Retinex processed image from the original image and an image produced by expanding the blurred image, and forms an output image from the original image and the Retinex processed image.

SUMMARY

However, in the Retinex processes disclosed in the above reference documents, reflectance R(x, y) values must be stored for all pixels in order to find a clipped region between the UpR and DownR. Further, reflectance R(x, y) values must be stored with decimal points, since the values are found using logarithmic calculations. When the above processing is performed on a personal computer, for example, the computer must store four bytes per pixel in the floating point format or eight bytes per pixel in the double-precision floating point format since the CPU and operating system of a common personal computer processes data in 32-bit units. Consequently, an enormous amount of storage capacity is necessary for storing reflectance R(x, y) values found through logarithmic computations. Further, since the number of logarithmic computations on the reflectance R(x, y) increases according to the volume of reflectance R(x, y) data, the length of time required before the computer can begin outputting the processed image increases according to the size of the original image.

Further, since the size of the memory storing the reflectance R(x, y) is the same size as the original image, the size of the memory storing reflectance increases as the original image increases in size. Further, since the volume of reflectance R(x, y) data increases as the size of the original image increases, the number of logarithmic computations on reflectance R(x, y) data also increases, requiring a greater length of time before the computer can begin outputting the processed image.

In view of the foregoing, it is an object of the invention to provide an image processing device and a storage medium storing an image processing program that is capable of performing the Retinex process at a high speed.

In order to attain the above and other objects, the invention provides an image processing device including, a retinex-value calculating portion, a normalizing-parameter reading portion, a normalizing portion, and a correcting portion. The retinex-value calculating portion calculates a retinex value of each pixel in an original image based both on a pixel value of a subject pixel and on a peripheral average luminance of the subject pixel. The normalizing-parameter reading portion reads an upper limit and a lower limit for performing normalization. The normalizing portion normalizes the retinex value based on the upper limit and the lower limit, thereby obtaining a normalized retinex value for each pixel in the original image. The correcting portion corrects the original image based both on the normalized retinex value and on the pixel value for each pixel in the original image, thereby obtaining a corrected image.

According to another aspect, the invention also provides a storage medium storing an image processing program. A storage medium storing a set of program instructions executable on an image processing device, the set of program instructions includes:

calculating a retinex value of each pixel in an original image based both on a pixel value of a subject pixel and on a peripheral average luminance of the subject pixel;
reading an upper limit and a lower limit for performing normalization;
normalizing the retinex value based on the upper limit and the lower limit, thereby obtaining a normalized retinex value for each pixel in the original image; and
correcting the original image based both on the normalized retinex value and on the pixel value for each pixel in the original image, thereby obtaining a corrected image.

According to another aspect, the invention also provides a storage medium storing an image processing program. An image processing method includes:

calculating a retinex value of each pixel in an original image based both on a pixel value of a subject pixel and on a peripheral average luminance of the subject pixel;
reading an upper limit and a lower limit for performing normalization;
normalizing the retinex value based on the upper limit and the lower limit, thereby obtaining a normalized retinex value for each pixel in the original image; and
correcting the original image based both on the normalized retinex value and on the pixel value for each pixel in the original image, thereby obtaining a corrected image.

DETAILED DESCRIPTION

Figure 1:
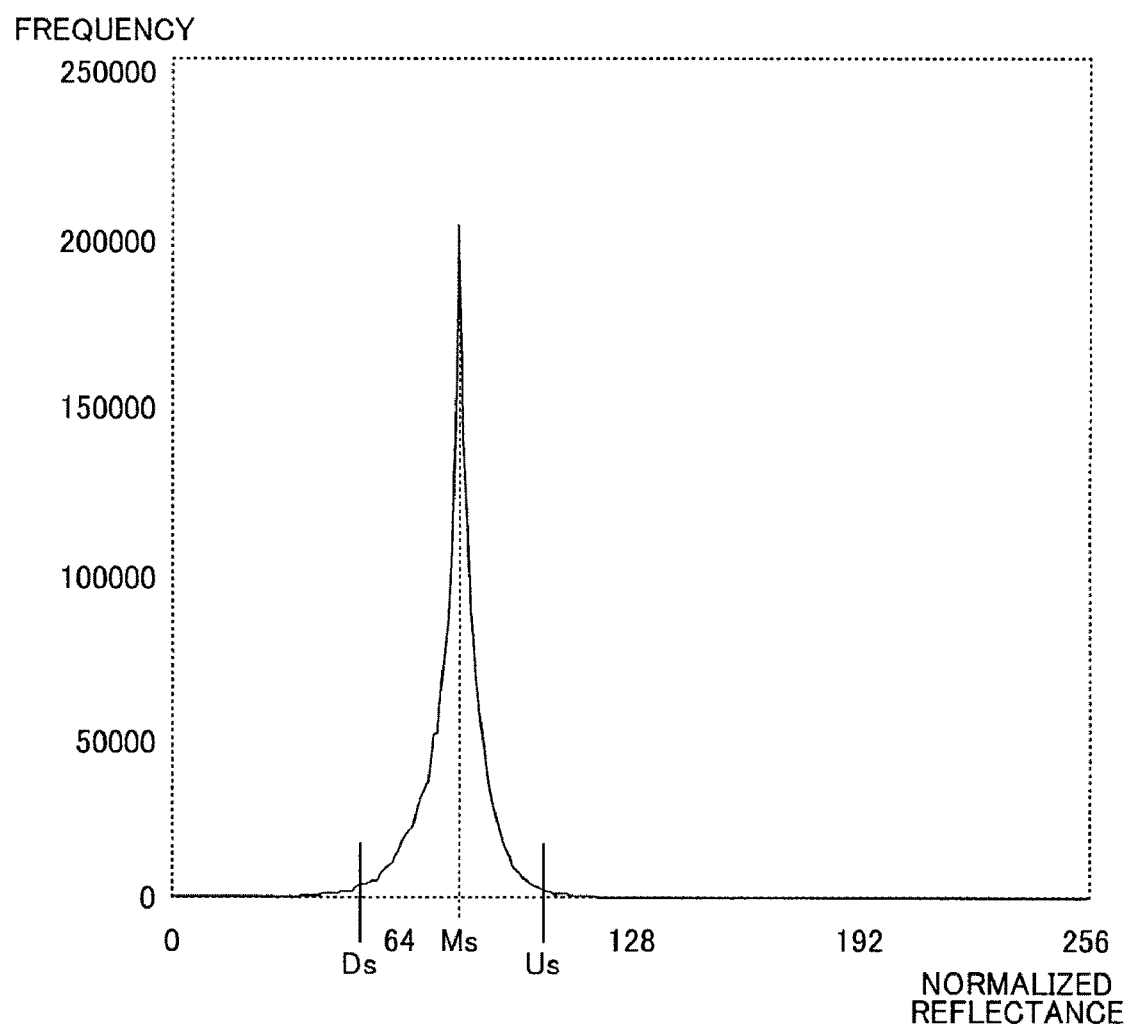
FIG. 1 is a histogram illustrating a clipped range used for normalization of reflectance R(x, y)
Figure 2:
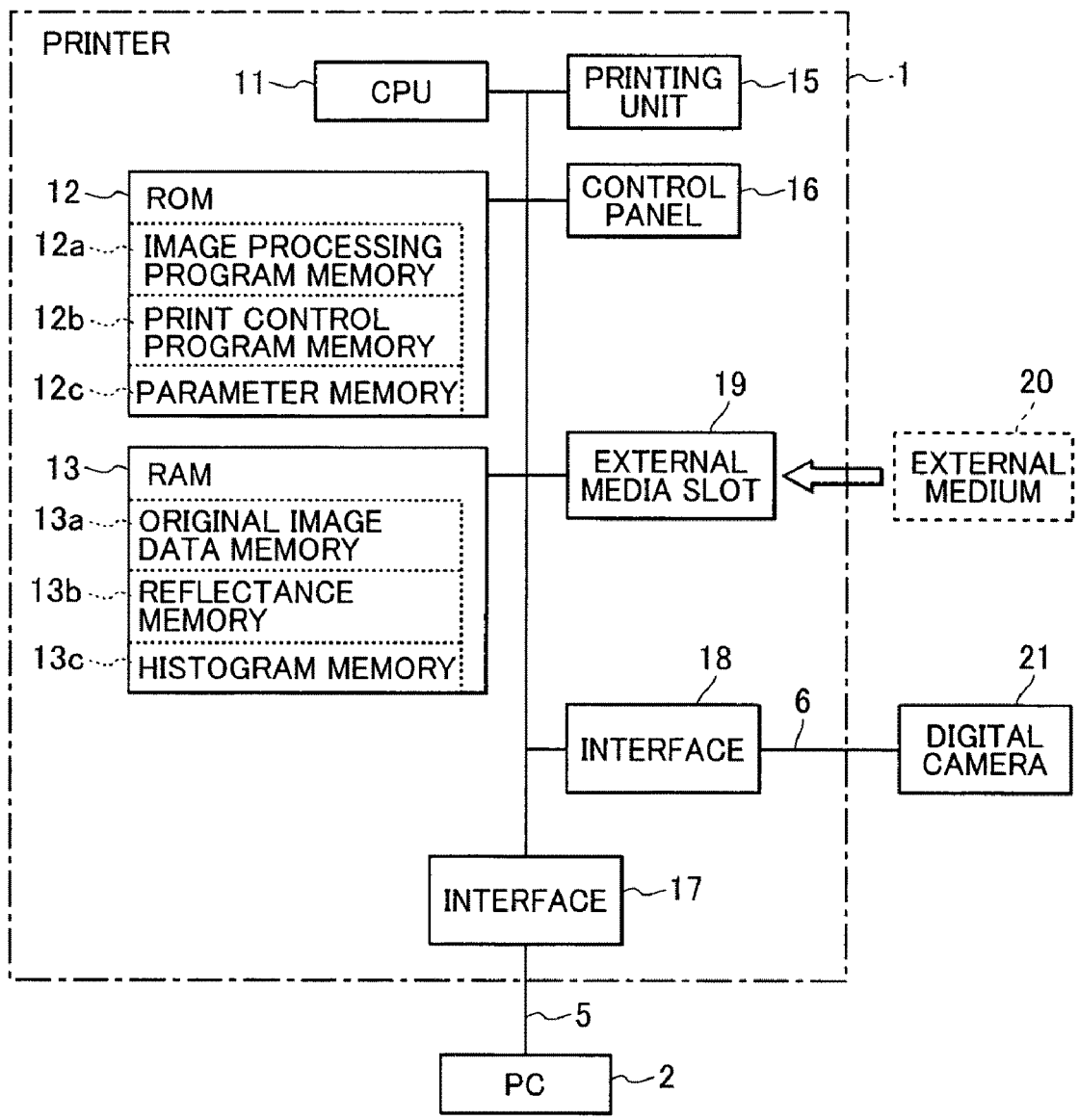
FIG. 2 is a block diagram showing the electrical structure of a printer having an image processing program according to an embodiment of the invention.

An image processing device and a storage medium storing an image processing program according to a first embodiment of the invention will be described. FIG. 2 is a block diagram showing the electrical structure of a printer 1 having a function for performing an image process according to the first embodiment. In the first embodiment, the printer 1 is connected to a personal computer (hereinafter referred to as a "PC") 2, a digital camera 21, and/or an external medium 20. An image processing program installed on the printer 1 executes a Retinex process and a histogram process on image data (image data for an original document or the like) inputted from the PC 2, digital camera 21, or external medium 20. The image processing program corrects low-quality regions of the image data, such as backlit image regions.

As shown in FIG. 2, the printer 1 includes a CPU 11, a ROM 12, a RAM 13, a printing unit 15, and a control panel 16. The printing unit 15 has a print head and the like for printing out image data on a printing medium, such as paper. The control panel 16 has a user operating unit configured of a ten-key pad and the like, for example, enabling the user to input values for the size of the outputted image and the like.

The printer 1 also includes an interface 17, an interface 18, and an external media slot 19. The interface 17 is provided for connecting the printer 1 to the PC 2 with a cable 5. The interface 18 is provided for connecting the printer 1 to the digital camera 21 with a cable 6. The external media slot 19 allows the user to detachably mount the external medium 20 in the printer 1, the external medium 20 being an SD card or a Memory Stick, for example. The interfaces 17 and 18 use the Universal Serial Bus (USB) communication method.

Accordingly, image data stored on the PC 2 can be inputted into the printer 1 via the cable 5 and the interface 17, while image data captured by the digital camera 21 can be inputted into the printer 1 via the cable 6 and the interface 18 Further, image data stored on the external medium 20 can be inputted into the printer 1 when the external medium 20 is mounted in the external media slot 19.

The CPU 11 is an arithmetic processor that controls the overall operations of the printer 1. The ROM 12 stores various control programs executed by the CPU 11 and fixed values used when the CPU 11 executes programs. The ROM 12 includes an image processing program memory 12a, a print control program memory 12b, and a parameter memory 12c. The image processing program memory 12a stores the image processing program for performing such image processing as the Retinex process and the histogram process. The print control program memory 12b stores a print control program for executing a printing operation. The parameter memory stores parameters represented by a table 1 shown below.

TABLE 1

| Kinds of Original Image | Parameter including Upper Limit and Lower Limit |
|---|---|
| Original Image A | Parameter a (Ua, Da) |
| Original Image B | Parameter b (Ub, Db) |

Original Image A:Rear Light Image of Portrait
Original Image B:Rear Light Image of Landscape
Here the Ua and Da are an upper limit and a lower limit of a clipped range of reflectance R(x, y) values (normalizing parameters) in the original image A. The Ub and Db are an upper limit and a lower limit of a clipped range of reflectance R(x, y) values (normalizing parameters) in the original image B.

The RAM 13 is a rewritable random access memory that includes a work area for storing a set of registers required when the CPU 11 executes the control programs, and a temporary area for temporarily storing data during such processes. The RAM 13 also includes an original image data memory 13a, a reflectance memory 13b (reduced-retinex-image memory), and a histogram memory 13c. The original image data memory 13a stores original image data. The reflectance memory 13b stores reflectance values that are obtained by reducing an original image and performing the Retinex process of the reduced image. The histogram memory 13c stores frequencies of pixel values of each pixel in the histogram process.

The original image data memory 13a stores image data inputted from the PC 2, digital camera 21, and external medium 20 via the interface 17, interface 18, and external media slot 19, respectively. In the embodiment, the original image data and output image data are configured of RGB values, each of which is a value in the range 0-255.

Specifically, the RGB values include components representing the three primary colors of light, i.e. an R value representing red, a G value representing green, and a B value representing blue, Together, the R, G, and B values are collectively referred to as a pixel value P. The combination of RGO values for each pixel of an input image indicates one color (hue, tone, etc.). The greater the RGB values, the higher the luminance (brightness).

The reflectance memory 13b is a memory area used for storing reflectances R(x, y) obtained from luminance values of the original image.

The histogram memory 13c stores a histogram for setting the clipped range used when normalizing reflectance R (x, y) values.

Figure 3:
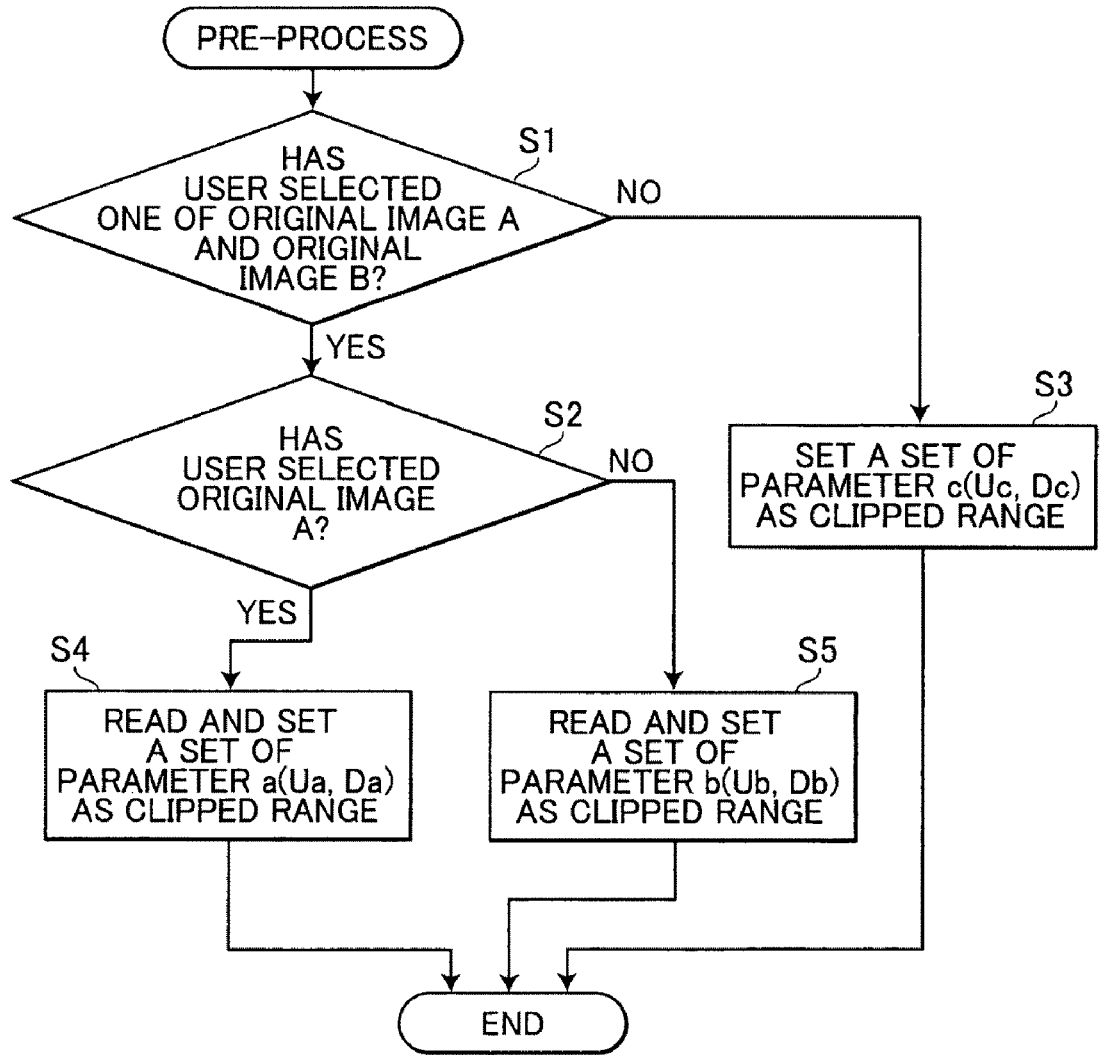
FIG. 3 is a flowchart illustrating steps in a pre-process of an image processing program according to the first embodiment.
Figure 4:
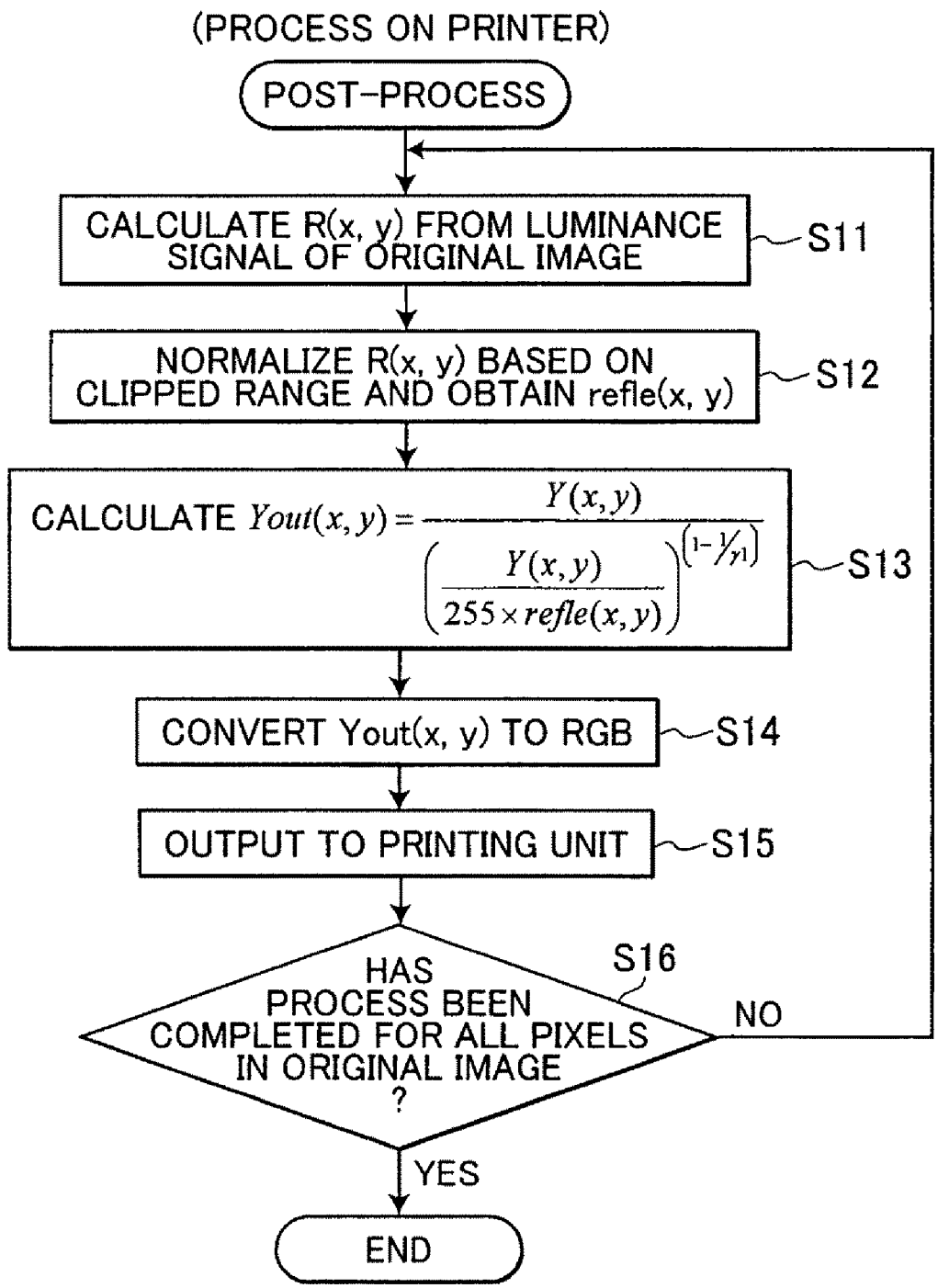
FIG. 4 is a flowchart illustrating steps in a post-process executed after the pre-process of the image processing program according to the first embodiment.

Next, an image process executed by the CPU 11 according to the image processing program stored in the image processing program memory 12a will be described with reference to FIGS. 3 and 4. In the embodiment, the CPU 11 performs a Retinex process on luminance signals for the original image. FIGS. 3 and 4 are flowcharts illustrating steps in this image process. The process shown in FIG. 3 will be referred to as a pre-process. In the pre-process, a clipped range for normalizing reflectance R of the original image (S11 in FIG. 3) is set by a user. The image is not outputted while the pre-process is executed.

In S1 of the pre-process shown in FIG. 3, the CPU 11 determines whether the user has selected one of the original image A and the original image B in the Table 1 displayed on a display in the control panel 16. If the user has selected one of the original image A and the original image B (S1:YES), the CPU 11 advances to S2. However, if the user does not select any one of the original image A and the original image B and wishes to input an arbitrary clipped range (S1:NO), in S3 the CPU 11 sets a set of parameter c (Uc, Dc) as the clipped range inputted by the user at the control panel 16.

In S2 the CPU 11 determines whether the user has selected the original image A. If the user has selected the original image A (S2:YES), in S4 the CPU 11 reads the set of parameter a(Ua, Da) from the parameter memory 12c and sets this set as the clipped range. However, if the user has not selected the original image A and has select the original image B (S2:NO), in S5 the CPU 11 reads the set of parameter b(Ub, Db) from the parameter memory 12c and sets this set as the clipped range.

Next, a post-process performed based on the clipped range found in the pre-process of FIG. 3 will be described with reference to FIG. 4. The post-process is a Retinex process performed on the original image. FIG. 4 is a flowchart illustrating steps in the Retinex process. The post-process is performed on each pixel in the original image and sequentially outputs processed pixel values (RGB values) to the printing unit 15.

In S11 at the beginning of the process, the CPU 11 finds luminance values Y and chromatic values Cr and Cb for pixels in the original image according to the following equation 4.

$$\begin{pmatrix} Y \\ Cr \\ Cb \end{pmatrix} = \begin{pmatrix} 0.30 & 0.59 & 0.11 \\ 0.60 & -0.28 & -0.32 \\ -0.21 & -0.52 & 0.31 \end{pmatrix} \begin{pmatrix} R \\ G \\ B \end{pmatrix} \qquad \text{[Equation 4]}$$

The luminance signal Y and chromatic signals Cb and Cr calculated above may be temporarily stored in the RAM 13 or the like to be used in subsequent processes. However, if it is desirable to reduce the storage volume, these values may be calculated in the above equation by reading pixel values from the original image as needed without storing the values in memory. Further, the CPU 11 calculates the reflectance R (x, y) for the luminance values according to following equation.

$$R(x, y) = \log \frac{Y(x, y)}{F(x, y) * Y(x, y)} \quad \text{[Equation 5]}$$

In S12 the CPU 11 reads the clipped range (sets of parameter a(Ua, Da), b(Ub, Db), or u(Uc, Dc)) set in S4, S5, or S3 and normalizes the reflectance R(x, y) values stored in the reflectance memory 13b within the clipped range, in order to find normalized reflectance (normalized Retinex value) refle (x, y). The reflectance R (x, y) values corresponding to the upper limit Ua, Ub, and Uc and lower limit Da, Db, and Dc are collectively called the UpR and DownR values, respectively. The normalized reflectance refle(x, y) is set to 0.0 when the value of reflectance R(x, y) is less than or equal to the DownR, is set to 1.0 when the value of reflectance R(x, y) is greater than or equal to UpR, and is calculated based on the following equation 6 when the value of reflectance R(x, y) is greater than DownR and less than UpR.

$$refle(x, y) = \frac{R(x, y) - DownR}{UpR - DownR} \quad \text{[Equation 6]}$$

Through this process, refle(x, y) is normalized to a value between 0.0 and 1.0. Through experimentation, it has been found preferable to add 0.3 to this value to obtain a value between 0.3 and 1.3 for refle(x, y).

In S13 the CPU 11 finds an output luminance value Yout(x, y) according to equation 7 show below. In other words, the CPU 11 performs the Retinex process on the luminance value for each pixel using refle (x, y) In equation 7, γ1 is a gamma constant and normally set to 1.5.

$$Yout(x, y) = \frac{Y(x, y)}{\left(\frac{Y(x, y)}{255 \times refle(x, y)}\right)^{(1-\frac{1}{\gamma 1})}} \quad \text{[Equation 7]}$$

In S14 the CPU 11 converts YCbCr values to RGB values based on equation 8 shown below. Yout in equation 8 corresponds to Yout (x, y) in equation 7. Cr and Cb in equation 8 correspond to Cr and Cb found in S11. Cb and Cr are stored in the RAM 13. Note that a coordinate (x, y) is omitted in equation 8 for simplification. The RGB values obtained in S14 are the result of performing the Retinex process on the RGB values of the original image.

$$\begin{pmatrix} R \\ G \\ B \end{pmatrix} = \begin{pmatrix} 1.00 & 0 & 1.37 \\ 1.00 & -0.34 & -0.70 \\ 1.00 & 1.73 & 0 \end{pmatrix} \begin{pmatrix} Yout \\ Cr \\ Cb \end{pmatrix} \quad \text{[Equation 8]}$$

In the process described above, the CPU 11 executes the Retinex process on a luminance signal for the original image and finds pixel values by converting the chromatic signals back to RGB values. In S15 the CPU 11 outputs the processed pixel values to the printing unit 15. Hence, by identifying the clipped range for performing normalization in the pre-process, the CPU 11 can sequentially process each pixel and output the results to the printing unit 15 in the post-process, thereby reducing the time from the start of image processing to the start of the printing operation.

In S16 the CPU 11 determines whether the above process has been completed for all pixels in the original image. If some unprocessed pixels remain (S16: NO), then the CPU 11 returns to S11. However, if the process has been completed for all pixels (S16: YES), then the CPU 11 ends the image processing.

In the first embodiment described above, since the clipped range is set by the user via the control panel 16, the printer 1 can reduce the time for finding (calculating) the clipped range and the time from the start of image processing to the start of outputting the image (the time of the process based on the image processing program), thereby increasing the processing speed. Further, by reducing the number of pixels (number of reflectance values) targeted when finding the clipped range, the printer 1 can reduce the memory storage space required for storing the reflectance values.

Further, since the Retinex process is performed based on luminance signals of the reduced image and the original image, the printer 1 can more reliably prevent color shifts and can reduce the number of times to perform calculations compared to the method of performing the Retinex process on each RPB value, thereby increasing the processing speed.

Next, an image processing device and a storage medium storing an image processing program according to a second embodiment of the present invention will be described while referring to the accompanying drawings.

In the second embodiment, the reflectance memory 13b is used for storing reflectances R(x, y) obtained from luminance values of the original image and for storing reflectances Rs(x, y) obtained from luminance values of the original image after the original image is compressed (reduced). The original image is compressed according to a method well known in the art, such as the nearest neighbor method for sampling a value of a pixel nearest a position of the original image corresponding to a pixel of the reduced image and for using the sampled pixel value, or the bi-cubic method or average pixel method for performing interpolation using pixels surrounding a position in the original image corresponding to a pixel of the reduced image. The nearest neighbor method is used when processing speed is given priority over image quality, and the bi-cubic method or average pixel method is used when giving priority to image quality over processing speed. Accordingly, an upper limit Us and a lower limit Ds of the clipped range (normalizing parameters) described later can be accurately set when using the bi-cubic method or the average pixel method, The original image is compressed according to one of these methods, and the reflectance for each pixel in the reduced image is calculated using equation 10 described later. The calculated reflectance values are stored in the reflectance memory 13b.

Figure 6:
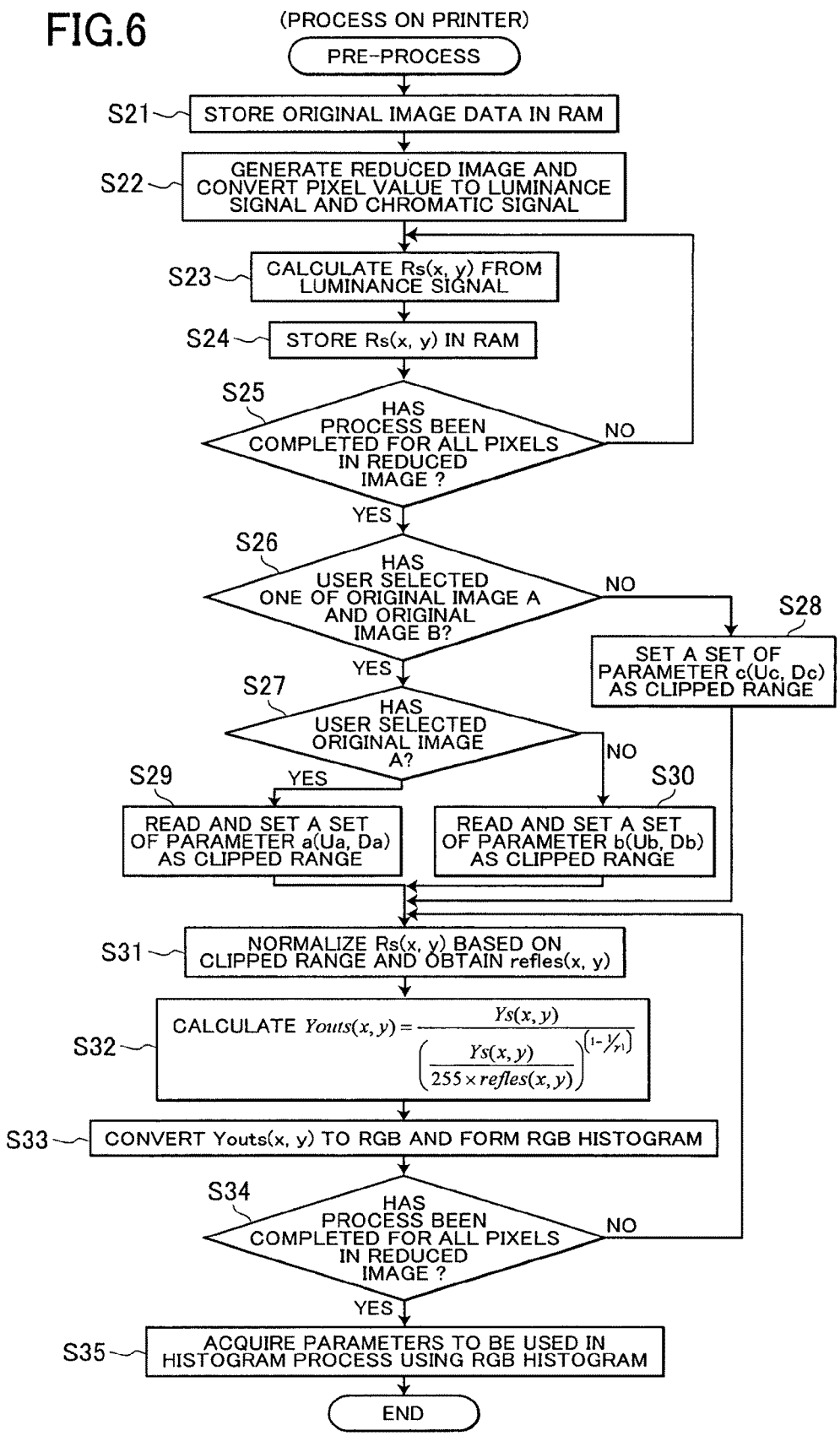
FIG. 6 is a flowchart illustrating steps in a pre-process of an image processing program executed by the printer according to a second embodiment.
Figure 7:
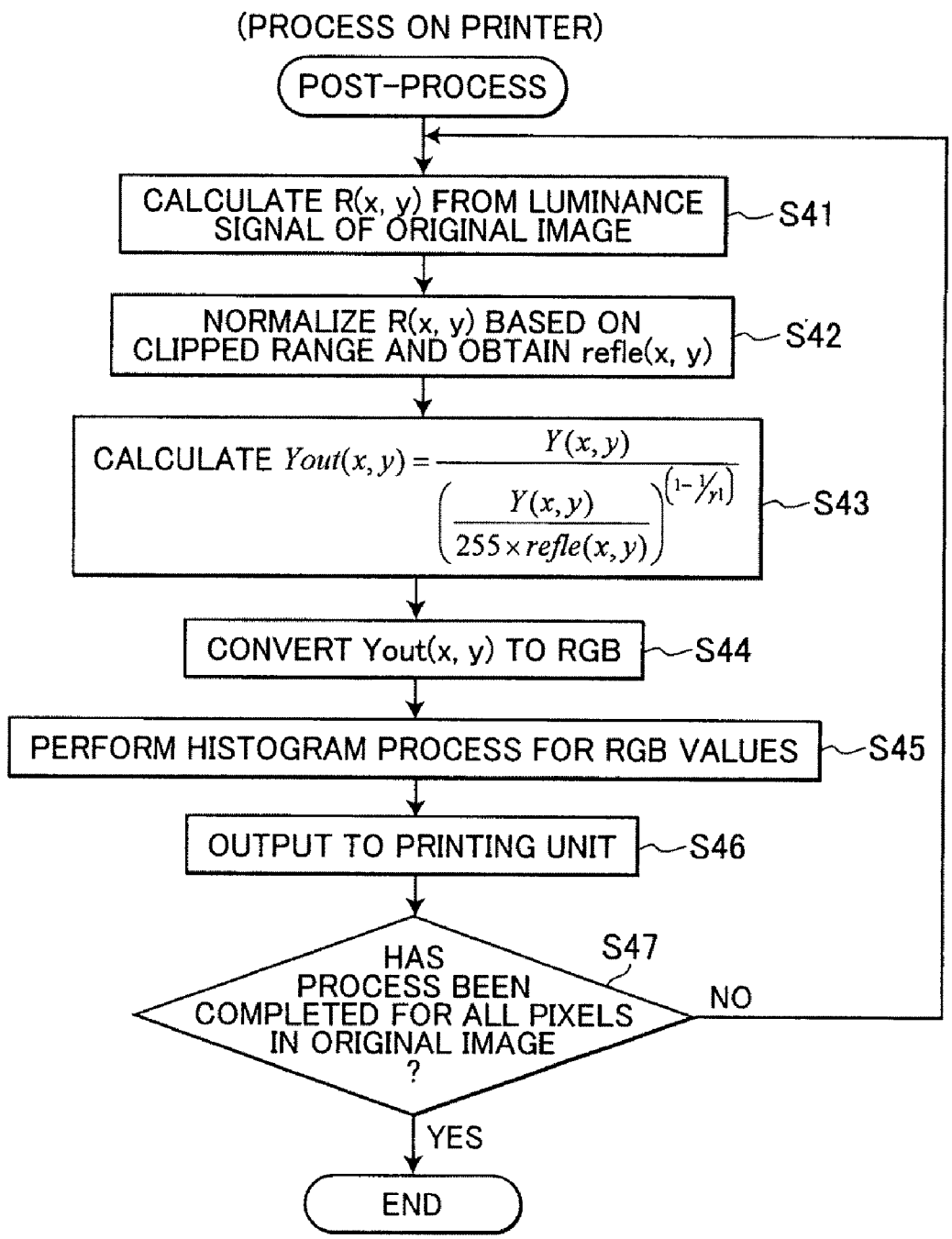
FIG. 7 is a flowchart illustrating steps in a post-process executed after the pre-process of the image processing program according to the second embodiment.

In the second embodiment, the histogram process is performed after performing the Retinex process according to the first embodiment (FIG. 4). The histogram process is performed because in some cases the dynamic range is too small or dark regions are too light, resulting in an unnatural image produced from the Retinex process. Performing the histogram process after the Retinex process improves the image quality. Specifically, parameters are set for the histogram process before performing the Retinex-process described in FIG. 4, and the histogram process is performed after performing the Retinex-process described in FIG. 4. Next, a pre-process as shown in FIG. 6 and post-process as shown in FIG. 7 executed on the image processing device according to the second embodiment will be described.

<Histogram Process>

Figure 5A:
FIG. 5A shows an example image used to illustrate a histogram process of the embodiment.
Figure 5B:
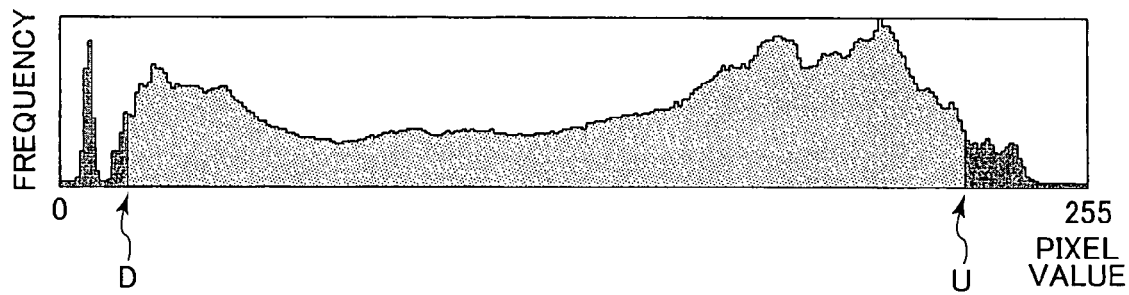
FIG. 5B is a histogram indicating pixel values of the image shown in FIG. 5A.

A histogram process will be described with reference to FIGS. 5A and 5B. The histogram process will be used in a post-process described later with reference to FIG. 7. FIG. 5A shows an example original image. FIG. 5B is a histogram formed from the original image shown in FIG. 5A. This histogram tabulates the number of pixels in the image having RGB values that indicate each integer 0-255, i.e. the frequency at which RGB values indicate each integer. In the case of color images, i.e. when each RGB value is represented by 8 bits, or a value from 0 to 255, each integer from 0 to 255 is tabulated by adding one for each pixel having an RGB value that matches the integer. For example, if the RGB values for a certain pixel are (100, 200, 200), then a "1" is added to the tabulation for the value 100 and a "2" is added to the tabulation for the value 200. The results of this tabulation are stored in the histogram memory 13*c*.

As shown in FIG. 5B, ratios for removing a light region and a dark region (cut ratios) are set for the histogram created above, and an upper limit U and a lower limit D are found from these ratios, For example, if each of the ratios for removing the light region and dark region is set to 3%, the upper limit U is set so that the number of pixels included in the light region from the maximum value 255 to the upper limit U corresponds to 3% of three times the total number of pixels (assuming the three values ROB for each pixel). Similarly, the lower limit D is set so that the number of pixels included in the dark region from the minimum value 0 to the lower limit D corresponds to 3% of three times the total number of pixels.

When setting the upper limit U and lower limit D in this way, values in the range from the minimum pixel value (0) to the lower limit D are set to the minimum value, and values in the range from the upper limit U to the maximum pixel value (255) are set to the maximum value. Values in the range from the lower limit D to the upper limit U are corrected with a linear or nonlinear function.

Specifically, if input is the inputted pixel value P (RGB value obtained in S44 of FIG. 7), output is the corrected pixel value (value obtained in S45 of FIG. 7), the pixel value P falls within a range from 0 to 255, and γ2 is a constant (γ2=1 in this embodiment), then output is set as follows:
(i) Output=0, when input is less than or equal to the lower limit D;
(ii) Output=255, when input is greater than or equal to the upper limit U; and
(iii) a value calculated from equation 9, when input is greater than the lower limit D and less than the upper limit U.

$$\text{Output} = a^{\gamma 2} \times 255 \qquad \text{[Equation 9]}$$

In equation 9, a=(input−D)/(U−D) When γ2=1, output expands linearly between the lower limit D and upper limit U.

Next, the preprocess according to the second embodiment will be described. FIG. 6 is a flowchart illustrating steps in the pre-process according to the second embodiment In S21 of the pre-process shown in FIG. 6, the CPU 11 reads original image data from the PC 2 or digital camera 21 and stores this data in the original image data memory 13*a* of the RAM 13. In S22 the CPU 11 generates a reduced image by compressing the original image and converts RGB values for each pixel in the reduced image to a luminance value (luminance signal) Y and chromatic values (chromatic signals) Cb and Cr.

The nearest neighbor method or average pixel method is used for generating the reduced image, and the above-described equation 4 are used to calculate the luminance signal Y and the chromatic signals Cb and Cr. The luminance signal Y and chromatic signals Cb and Cr calculated above may be temporarily stored in the RAM 13 or the like to be used in subsequent processes.

In S23 the CPU 11 calculates a reflectance Rs (x, y) from the luminance value Y calculated above for each pixel in the reduced image. Here, the "s" is added to the end of symbols for indicating the reduced image as opposed to the original image. The reflectance Rs(x, y) is calculated according to the following equation, where Ys(x, y) is the luminance value of the pixel in the reduced image, and Fs(x, y) is the filter for the reduced image.

$$Rs(x, y) = \log \frac{Ys(x, y)}{Fs(x, y) * Ys(x, y)} \qquad \text{[Equation 10]}$$

In equation 10, x is the horizontal coordinate, y is the vertical coordinate, Ys(x, y) is the luminance value of the pixel at the coordinate (x, y) "*" is the convolution operator. Further, log is the natural logarithm to the base e. Fs(x, y) represents a Gaussian filter factor at the subject pixel (x, y) as shown in the following equation:

$$Fs(x, y) = \exp(-(x^2+y^2)/(c/75)^2) \qquad \text{[Equation 11]}$$

where c is a coefficient determined dependently on the number of the peripheral pixels. So, the value Fs(x, y)*Ys(x, y) indicates the average value of the luminance values of the peripheral pixels.

In S24 the CPU 11 stores the reflectance Rs (x, y) found in the above calculations in the reflectance memory 13*b* of the RAM 13. In S25 the CPU 11 determines whether the process in S23-S24 has been completed for all coordinates in the reduced image. If unprocessed coordinates remain (S25: NO), the CPU 11 returns to S23. However, if the process has been completed for all coordinates (S25: YES), the CPU 11 advances to S26.

Since S26-S30 in the pre-process of FIG. 6 are identical to S1-S5 in FIG. 3, a description of these steps has been omitted.

After completing S24, S25, or S26 in FIG. 6, in S31 the CPU 11 normalizes the reflectance Rs(x, y) values (reduced Retinex image) stored in the reflectance memory 13*b* within the clipped range (UpR, DownR) obtained in S24, S25, or S26, and finds the refles(x, y) according to equation 12 show below.

$$refles(x, y) = \frac{Rs(x, y) - DownR}{UpR - DownR} \qquad \text{[Equation 12]}$$

In S32 the CPU 11 finds an output luminance value Youts(x, y) according to equation 12. In other words, the CPU 11 performs the Retinex process on the luminance value for each pixel in the reduced image.

$$Youts(x, y) = \frac{Ys(x, y)}{\left(\frac{Ys(x, y)}{255 \times refles(x, y)}\right)^{(1-\frac{1}{\gamma 1})}} \qquad \text{[Equation 13]}$$

In S33 the CPU 11 converts YCbCr values to RGB values based on equation 14 shown below and records the values in the histogram Youts in equation 14 corresponds to Youts(x, y) in equation 13. Cr and Cb in equation 14 correspond to Cr and Cb found in S22. Note that a coordinate (x, y) is omitted in equation 14 for simplification.

$$\begin{pmatrix} R \\ G \\ B \end{pmatrix} = \begin{pmatrix} 1.00 & 0 & 1.37 \\ 1.00 & -0.34 & -0.70 \\ 1.00 & 1.73 & 0 \end{pmatrix} \begin{pmatrix} Youts \\ Cr \\ Cb \end{pmatrix} \quad \text{[Equation 14]}$$

Recording values in the histogram involves adding "1" to RGB values taking on integer values between 0 and 255 for each corresponding R value, G value, and B value obtained in S33. The incremented values are stored in the histogram memory 13c.

In S34 the CPU 11 determines whether the process from S31 to 333 has been completed for all the pixels in the reduced image. If there are still unprocessed pixels (S34: NO), then the CPU 11 returns to S31. If the process has been completed for all pixels (S34: YES), then in S35 the CPU 11 acquires parameters to be used in the histogram process from the histogram formed in the histogram memory 13c. These parameters include the constant γ2, the upper limit U, and the lower limit D. The constant γ2 is set to 1 by default. The upper limit U and the lower limit D are obtained from the histogram formed in S33, because the cut ratios for removing the light region and dark region from the histogram are set to 3% by default.

Hence, through the process described above, the CPU 11 acquires parameters for use in the histogram process performed after the Retinex process.

Next, the post-process executed after setting the parameters will be described with reference to FIG. 7. FIG. 7 is a flowchart illustrating steps in the post-process according to the second embodiment In the post-process, the CPU 11 performs the Retinex process and the histogram process for each pixel in the original image sequentially and outputs processed values to the printing unit 15.

Since S41-S44 in the post-process of FIG. 7 are identical to S11-S34 in FIG. 4, a description of these steps has been omitted.

After completing the process in S44, in S45 the CPU 11 performs the histogram process for RGB values, that underwent the Retinex process, based on parameters obtained in S35. In S46 the CPU 11 outputs processed RGB values to the printing unit 15.

In S47 the CPU 11 determines whether the process has been completed for all pixels in the original image. If there are still unprocessed pixels (S47: NO), then the CPU 11 returns to S41. If the process has been completed for all the pixels (S47: YES), then the CPU 11 ends the post-process of FIG. 7.

In the second embodiment described above, the printer 1 converts a color image to luminance signals, performs the Retinex process on the luminance signals, and reconverts the luminance signals obtained from the Retinex process to a color image before performing the histogram process. In this way, the printer 1 can broaden the dynamic range of the image to obtain an image of higher quality. The printer 1 also improves image quality by setting parameters for the histogram process based on parameters in the Retinex process.

In the second embodiment described above, since the clipped range is set by the user, the printer 1 can reduce the time for finding (calculating) the clipped range and the time from the start of image processing to the start of outputting the image (the time of the process based on the image processing program), thereby increasing the processing speed.

In the second embodiment, the printer 1 acquires parameters for the histogram process performed after the Retinex process. However, it is not necessary to process the reduced image to set parameter values for the histogram process if the user can input and set appropriate parameter values by viewing the image via the control panel 16, or if parameter values can be determined from a similar image. In such cases, the histogram process can be performed sequentially on each pixel in the original image, quickly obtaining output.

While the invention has been described in detail with reference to the above aspects thereof, it would be apparent to those skilled in the art that various changes and modifications may be made therein without departing from the spirit of the invention.

In the above-described embodiment, the clipped range is set in accordance with user's selection of one of the plurality of kinds of images or user's input. However, the parameter memory 12c may store a default set of parameter (upper limit and lower limit), and the CPU 11 may read the default set of parameter (upper limit and lower limit) in S 12 and S31. In such case, the printer 1 can perform the Retinex process more quickly.

In the above-described embodiment, the lower limit D used in the histogram process is set so that the number of pixels included in the dark region corresponds to 3% of three times the total number of pixels. However, the lower limit D may be set according to the value of γ1 in equation 9 of the Retinex process. The image is corrected to be brighter when the value of γ1 is larger and corrected less when the value of γ1 is smaller. Hence, when γ1 is larger the value of the lower limit D is increased (the cut ratio or amount of the dark region that is cut is increased). In this way, the bright region of a resultant image can be emphasized by shifting the pixel values to the darker side as a whole through the histogram process.

In the above-described embodiment, the value of γ2 used in the histogram process is set to 1 by default. However, the value of γ2 may be set as follows. The Retinex process corrects backlit portions and the like, but also corrects the overall image to be brighter, giving a different impression from the original image. By applying gamma correction in the histogram process opposite the gamma correction used for adjusting the luminance in the Retinex process, it is possible to restore regions that are too bright to a natural state. Hence, the value of γ2 may be found according to the following equation based on a constant γ1 used for gamma correction in the Retinex process (equation 9). Specifically, γ2 can be found from equation:

$$\gamma 2 = (\gamma 1 - 1.0)A + 1.0$$

where A is a value between 5 and 20.

Alternatively, the value of γ2 may be set so that the median value after the Retinex process approaches the median value prior to the Retinex process. If input is the pixel value, output is the corrected pixel value, B is the overall range of pixel values, MAX is the maximum value of the overall range, MIN is the minimum value of the overall range, D is an upper limit of a lower range, U is a lower limit of an upper range, OM is the median value of the original image, RM is the median value of the image processed in the Retinex process described above, and α is a constant, output is set as follows:

output=MIN, when input is in the lower range (less than D);
output=MAX, when input is in the upper range (greater than U); and
output=a value derived from equation 15 when input is between D and U, $$\text{Output} = a^{\gamma 2} \times B \quad \text{[Equation 15]}$$

where $$a = (\text{input} - D)/(U - D)$$

$$\gamma 2 = \log(\text{target}/\text{MAX})/\log(\text{RM}/\text{MAX}), \text{ and}$$

$$\text{target} = (OM \times \alpha + RM)/(1 + \alpha)$$

When the constant α is set to 1, target is set between the median value prior to the Retinex process and the median value after the Retinex process. The value of target is set to approach the median value of the original image when the constant α is greater than 1, and to separate from the median value of the original image when the constant α is less than 1. The constant α may be set to a predetermined value or may be arbitrarily set by the user, In the above-described embodiment, the RGB color system is used, but a color system other than the RGB color system may be used. For example, the invention may be applied to the CMY color model or the like.

In the above-described embodiment, the CPU 11 provided in the printer 1 executes the image processing program. However, this program may be provided to a personal computer as an application program that is executed by a CPU or the like provided in the personal computer. Further, the program may be executed by a multifunction peripheral having a plurality of functions including printer, scanner, copier, facsimile, and the like.

Either the single-scale Retinex (SSR) or multi-scale Retinex (MSR) method may be used in the Retinex process.

In the above-described embodiment, the CPU 11 in the printer 1 performs the Retinex process and the like. However, these processes may be performed with a digital signal processor (DSP). The DSP can be used to execute product-sum operations and other operations more quickly.

The original color image in the second embodiment is separated into luminance signals and chromatic signals (YCbCr), and the Retinex process is performed on the luminance signals. Subsequently, the color image is restored based on the chromatic signals. However, it is also possible to perform the same process, but separate the original color image into luminance signals and color-difference signals (YIQ).

In the above-described embodiments, a luminance value Y is calculated from pixel values (RGB) of a color image, then a Retinex process is performed on the luminance value Y. However the Retinex process may be performed on each of RGB values.

What is claimed is:

1. An image processing device comprising:
    a processor configured to execute instructions that causes the processor to provide functional portions including:
    a retinex-value calculating portion that calculates a retinex value of each pixel in an original image based both on a pixel value of a subject pixel and on a peripheral average luminance of the subject pixel;
    a normalizing-parameter reading portion that reads an upper limit and a lower limit for performing normalization;
    a normalizing portion that normalizes the retinex value based on the upper limit and the lower limit, thereby obtaining a normalized retinex value for each pixel in the original image; and
    a correcting portion that corrects the original image based both on the normalized retinex value and on the pixel value for each pixel in the original image, thereby obtaining a corrected image.

2. The image processing device according to claim 1, wherein the processor is further configured to provide a normalizing-parameter setting operating portion that enables an operation of a user for setting the upper limit and the lower limit.

3. The image processing device according to claim 2, further comprising a parameter memory that stores a plurality of sets of the upper limit and the lower limit,
    wherein the normalizing-parameter reading portion reads one of the plurality of sets of the upper limit and the lower limit in accordance with the operation of the user.

4. The image processing device according to claim 3, wherein the parameter memory stores the plurality of sets of the upper limit and the lower limit in a one-to-one correspondence with a plurality of kinds of images; and
    wherein the normalizing-parameter reading portion reads one of the plurality of sets of the upper limit and the lower limit in accordance with user's selection of one of the plurality of kinds of images.

5. The image processing device according to claim 4, wherein the plurality of kinds of images includes a portrait image and a landscape image.

6. The image processing device according to claim 2, wherein the normalizing-parameter setting operating portion enables the user to input arbitrary values of the upper limit and the lower limit; and
    wherein the normalizing-parameter reading portion reads the arbitrary values of the upper limit and the lower limit.

7. The image processing device according to claim 1, further comprising a parameter memory that stores a default set of the upper limit and the lower limit,
    wherein the normalizing-parameter reading portion reads the default set of the upper limit and the lower limit.

8. The image processing device according to claim 1, wherein the retinex-value calculating portion calculates the retinex value based both on a luminance signal obtained for the subject pixel and on the peripheral average luminance of the subject pixel; and
    wherein the correcting portion corrects the original image based both on the normalized retinex value and on the luminance signal for each pixel in the original image.

9. The image processing device according to claim 1, wherein the processor is further configured to provide a histogram-process performing portion that performs a histogram process including both obtaining frequencies of pixel values in the corrected image and correcting the pixel values by changing a range that the pixel values take.

10. The image processing device according to claim 9, wherein the processor is further configured to provide a histogram-process parameter setting portion that sets a histogram-process parameter used in the histogram process,
    wherein the histogram-process performing portion corrects the pixel values based on the histogram-process parameter.

11. The image processing device according to claim 10, wherein the processor is further configured to provide a histogram-parameter setting operating portion that enables an operation of a user for setting the histogram-process parameter,
    wherein the histogram-process parameter setting portion sets the histogram-process parameter in accordance with the operation of the user.

12. A computer-readable storage device storing a set of program instructions executable on an image processing device, the set of program instructions comprising:
    calculating a retinex value of each pixel in an original image based both on a pixel value of a subject pixel and on a peripheral average luminance of the subject pixel;
    reading an upper limit and a lower limit for performing normalization;
    normalizing the retinex value based on the upper limit and the lower limit, thereby obtaining a normalized retinex value for each pixel in the original image; and correcting the original image based both on the normalized retinex value and on the pixel value for each pixel in the original image, thereby obtaining a corrected image.

13. The storage device according to claim 12, wherein the set of program instructions further comprises enabling a user to perform an operation for setting the upper limit and the lower limit.

14. The storage device according to claim 13, wherein the image processing device includes a parameter memory that stores a plurality of sets of the upper limit and the lower limit; and wherein the reading instructions comprise reading one of the plurality of sets of the upper limit and the lower limit in accordance with the operation of the user.

15. The storage device according to claim 14, wherein the parameter memory stores the plurality of sets of the upper limit and the lower limit in a one-to-one correspondence with a plurality of kinds of images; and wherein the reading instructions comprise reading one of the plurality of sets of the upper limit and the lower limit in accordance with user's selection of one of the plurality of kinds of images.

16. The storage device according to claim 15, wherein the plurality of kinds of images includes a portrait image and a landscape image.

17. The storage device according to claim 13, wherein the enabling instructions comprise enabling the user to input arbitrary values of the upper limit and the lower limit; and wherein the reading instructions comprise reading the arbitrary values of the upper limit and the lower limit.

18. The storage device according to claim 12, wherein the image processing device includes a parameter memory that stores a default set of the upper limit and the lower limit; and wherein the reading instructions comprise reading the default set of the upper limit and the lower limit.

19. The storage device according to claim 12, wherein the calculating instructions comprise calculating the retinex value based both on a luminance signal obtained for the subject pixel and on the peripheral average luminance of the subject pixel; and wherein the correcting instructions comprise correcting the original image based both on the normalized retinex value and on the luminance signal for each pixel in the original image.

20. The storage device according to claim 12, wherein the set of program instructions further comprises performing a histogram process including both obtaining frequencies of pixel values in the corrected image and correcting the pixel values by changing a range that the pixel values take.

21. The storage device according to claim 20, wherein the set of program instructions further comprises setting a histogram-process parameter used in the histogram process; and wherein the instructions for performing a histogram process comprise correcting the pixel values based on the histogram-process parameter.

22. The storage device according to claim 21, wherein the set of program instructions further comprise enabling a user to perform an operation for setting the histogram-process parameter; and wherein the instructions for setting a histogram-process parameter comprise setting the histogram-process parameter in accordance with the operation of the user.

23. An image processing method comprising:

providing an image processing device with an original image having pixel values, the image processing device having a processor for performing a retinex process comprising the steps of:

calculating a retinex value of each pixel in the original image based both on a pixel value of a subject pixel and on a peripheral average luminance of the subject pixel;

reading an upper limit and a lower limit from a parameter memory for performing normalization;

normalizing the retinex value based on the upper limit and the lower limit, thereby obtaining a normalized retinex value for each pixel in the original image; and correcting the original image based both on the normalized retinex value and on the pixel value for each pixel in the original image, thereby obtaining a corrected image.

* * * * *